United States Patent
Stewart et al.

(10) Patent No.: US 10,296,069 B2
(45) Date of Patent: May 21, 2019

(54) BANDWIDTH-MONITORED FREQUENCY HOPPING WITHIN A SELECTED DRAM OPERATING POINT

(71) Applicant: QUALCOMM INCORPORATED, San Diego, CA (US)

(72) Inventors: Richard Stewart, San Diego, CA (US); Dexter Chun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 109 days.

(21) Appl. No.: 15/634,956

(22) Filed: Jun. 27, 2017

(65) Prior Publication Data

US 2018/0373314 A1 Dec. 27, 2018

(51) Int. Cl.
*G06F 1/32* (2019.01)
*G06F 1/3234* (2019.01)
*G06F 1/3237* (2019.01)
*G06F 13/16* (2006.01)
*G06F 13/40* (2006.01)
*G06F 1/3296* (2019.01)
*G06F 1/3225* (2019.01)
*G06F 1/324* (2019.01)

(52) U.S. Cl.
CPC ............ *G06F 1/3275* (2013.01); *G06F 1/324* (2013.01); *G06F 1/3225* (2013.01); *G06F 1/3237* (2013.01); *G06F 1/3296* (2013.01); *G06F 13/1689* (2013.01); *G06F 13/4068* (2013.01); *G06F 2213/0064* (2013.01)

(58) Field of Classification Search
CPC ..................................................... G06F 1/324
See application file for complete search history.

(56) References Cited

U.S. PATENT DOCUMENTS

| | | | |
|---|---|---|---|
| 9,395,784 B2 | 7/2016 | Sodhi et al. | |
| 9,459,689 B2 | 10/2016 | Ganpule et al. | |
| 9,575,537 B2 | 2/2017 | Ignowski et al. | |
| 2011/0320839 A1 | 12/2011 | David et al. | |
| 2012/0198266 A1* | 8/2012 | Hofmann | G06F 1/06 713/501 |
| 2015/0006924 A1 | 1/2015 | Jain et al. | |
| 2015/0378424 A1* | 12/2015 | Anyuru | G06F 1/3234 713/320 |
| 2016/0070582 A1 | 3/2016 | Clovis et al. | |
| 2016/0110132 A1 | 4/2016 | Wei et al. | |
| 2016/0259392 A1 | 9/2016 | Weissmann et al. | |

OTHER PUBLICATIONS

International Search Report and Written Opinion—PCT/US2018/029457—ISA/EPO—dated Jul. 11, 2018.

* cited by examiner

*Primary Examiner* — Albert Wang
(74) *Attorney, Agent, or Firm* — Smith Tempel Blaha LLC

(57) ABSTRACT

Systems, methods, and computer programs are disclosed for reducing dynamic random access memory (DRAM) power consumption within a selected voltage frequency/bin. One embodiment is a method comprising receiving a selected voltage/frequency bin for operating a memory bus electrically coupling a memory controller to a dynamic random access memory (DRAM). The method monitors a bandwidth of the memory bus while operating at the selected voltage/frequency bin. The method frequency switches a clock for the memory bus, based on the monitored bandwidth, between a plurality of predefined frequencies within the selected voltage/frequency bin to maintain a target bandwidth.

30 Claims, 8 Drawing Sheets

| Voltage/Frequency Bin₀ (0 – 400 MHz) | | | |
|---|---|---|---|
| Valid Frequencies | Minimum Allowable Residency Time (*power constraint*) | Maximum Allowable Residency Time (*EMI constraint*) | Memory Latency Threshold |
| | | | |
| | | | |
| | | | |

702 → Valid Frequencies
704 → Minimum Allowable Residency Time
706 → Maximum Allowable Residency Time
708 → Memory Latency Threshold
700

*FIG. 7*

BANDWIDTH-MONITORED FREQUENCY HOPPING WITHIN A SELECTED DRAM OPERATING POINT

DESCRIPTION OF THE RELATED ART

Portable computing devices (e.g., cellular telephones, smart phones, tablet computers, portable digital assistants (PDAs), portable game consoles, wearable devices, and other battery-powered devices) and other computing devices continue to offer an ever-expanding array of features and services, and provide users with unprecedented levels of access to information, resources, and communications. To keep pace with these service enhancements, such devices have become more powerful and more complex. Portable computing devices now commonly include a system on chip (SoC) comprising a plurality of memory clients embedded on a single substrate (e.g., one or more central processing units (CPUs), a graphics processing unit (GPU), digital signal processors (DSPs), etc.). The memory clients may read data from and store data in an external dynamic random access memory (DRAM) electrically coupled to the SoC via a high-speed bus, such as, a double data rate (DDR) bus.

The energy efficiency and power consumption of such portable computing devices may be managed to meet performance demands, workload types, etc. For example, the SoC may include a controller for implementing dynamic clock and voltage scaling (DCVS) techniques. DCVS involves selectively adjusting the frequency and/or voltage applied to the processors, hardware devices, etc. to yield the desired performance and/or power efficiency characteristics. The DCVS controller may select from a set of predefined power/performance optimal operating points (e.g., voltage/frequency bins) for operating a DRAM control and data bus and a DRAM clock. The operating points may be selected while minimizing electromagnetic interference (EMI) to communication components in the SoC.

Existing DCVS techniques suffer from several disadvantages. For example, aliasing of the power/performance operating points may result in intermediate bandwidth requirements being serviced by a higher-than-necessary operating frequency point, which may result in excessive power consumption. Furthermore, EMI is coupled to the operating clock, which can be reduced via a frequency hopping technique.

Accordingly, there is a need for improved systems and methods for reducing memory power consumption and/or EMI within a selected operating point via bandwidth-monitored frequency hopping.

SUMMARY OF THE DISCLOSURE

Systems, methods, and computer programs are disclosed for reducing dynamic random access memory (DRAM) memory power consumption within a selected voltage frequency/bin. One embodiment is a method comprising receiving a selected voltage/frequency bin for operating a memory bus electrically coupling a memory controller to a dynamic random access memory (DRAM). The method monitors a bandwidth of the memory bus while operating at the selected voltage/frequency bin. The method frequency switches a clock for the DDR bus between a plurality of predefined frequencies within the selected voltage/frequency bin based on the monitored bandwidth to maintain a target bandwidth.

An embodiment of a system comprises a dynamic clock and voltage scaling (DCVS) controller, a memory controller, and a dynamic frequency planning module. The DCVS controller is configured to select one of a plurality of voltage/frequency bins for operating a memory bus. The memory controller is electrically coupled to a dynamic random access memory (DRAM) via the memory bus. The dynamic frequency planning module is in communication with the memory controller and the DCVS controller. The dynamic frequency planning module comprises logic configured to: receive the selected voltage/frequency bin from the DCVS controller; monitor a bandwidth of the memory bus while operating at the selected voltage/frequency bin; and frequency switch a clock for the memory bus between a plurality of predefined frequencies within the selected voltage/frequency bin based on the monitored bandwidth to maintain a target bandwidth.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

FIG. 7 is a table illustrating exemplary frequency hopping parameters for a voltage/frequency bin$_0$.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "communication device," "wireless device," "wireless telephone", "wireless communication device," and "wireless handset" are used interchangeably. With the advent of third generation ("3G"), fourth generation ("4G"), fifth generation ("5G") and other wireless technology, greater bandwidth availability has enabled more portable computing devices with a greater variety of wireless capabilities.

Figure 1:
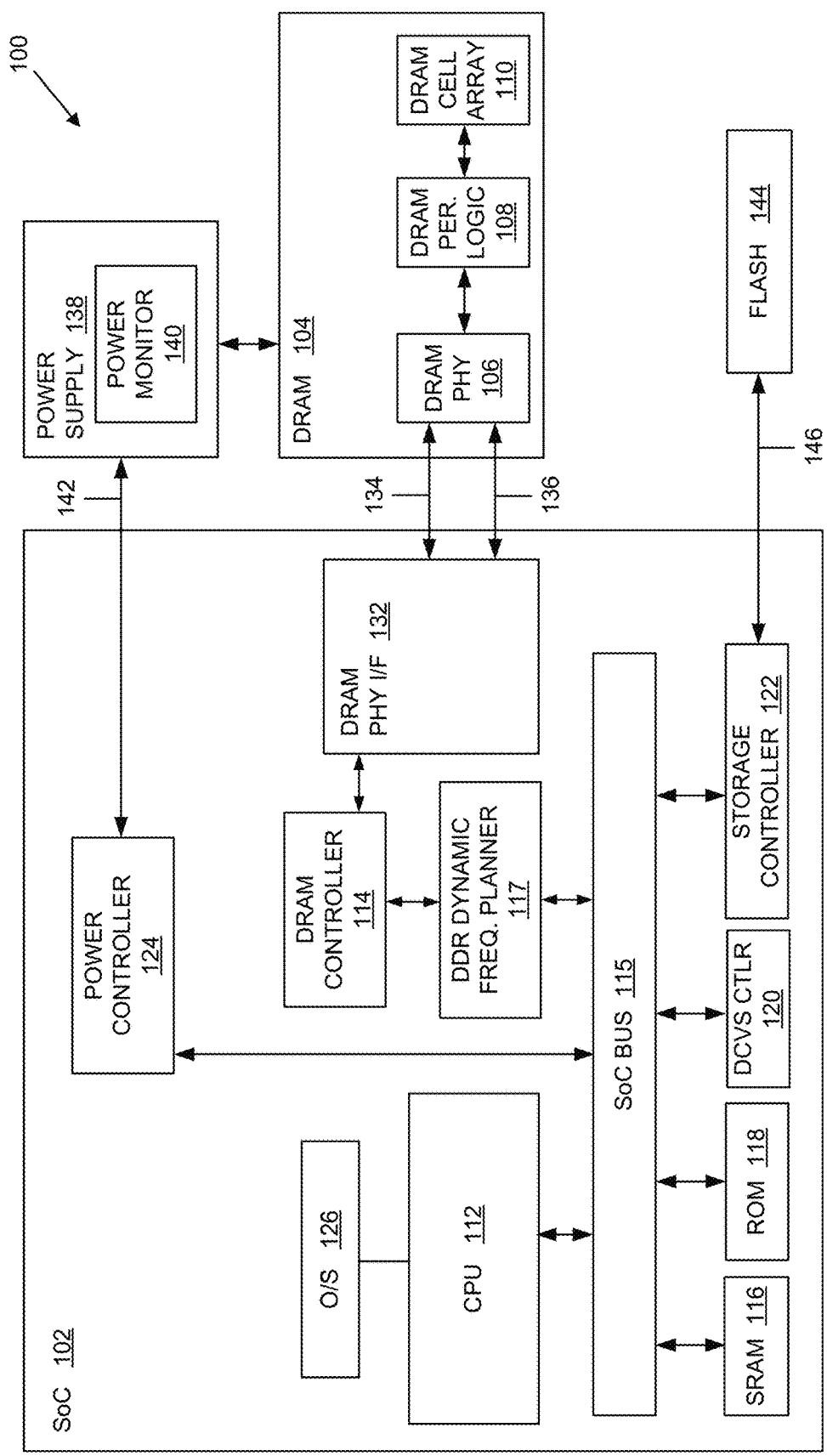
FIG. 1 is a block diagram of an embodiment of a system for implementing bandwidth/latency-monitored frequency hopping within a selected dynamic random access memory (DRAM) operating point.

FIG. 1 illustrates an embodiment of a system 100 for implementing bandwidth/latency-monitored frequency hopping within a selected dynamic random access memory (DRAM) operating point. The system 100 comprises a system on chip (SoC) 102 electrically coupled to a DRAM 104 via a memory interface. In an embodiment, the DRAM 104 comprises a double data rate (DDR) synchronous DRAM configured to operate at two or more dynamically selectable frequencies, and the memory interface comprises a DDR bus supporting any of the following: low power DDR (LPDDR), LPDDR2, LPDD3, DDR2, DDR3, etc. As known in the art, the DDR interface comprises a physical layer channel or bus that transfers data on both a rising and falling edges of a clock signal. The DDR interface comprises a DRAM clock 136 and a DRAM control and data bus 134. It should be appreciated that system 100 may be implemented in any computing device, including a personal computer, a workstation, a server, a laptop computer, a gaming console, and a portable computing device (PCD), such as a cellular telephone, a smartphone, a portable digital assistant (PDA), a portable game console, a navigation device, a tablet computer, a fitness computer, and a wearable device (e.g., a sports watch, a fitness tracking device, etc.) or other battery-powered devices with a wireless connection or link. In other embodiments, the system 100 may be integrated in industry-specific computing systems, such as, for example, automotive information/entertainment systems or advanced driver assistance systems (ADAS).

The SoC 102 comprises various on-chip components electrically coupled via SoC bus 115. In the embodiment of FIG. 1, the SoC 102 comprises one or more memory clients (e.g., central processing unit(s) (CPU) 112 supporting a high-level operating system (O/S) 126, graphics processing unit(s) (GPU), digital signal processor(s) (DSPs)), a static random access memory (SRAM) 116, read only memory (ROM) 118, a DRAM controller 114, a storage controller 122, a power controller 124, and a dynamic clock and voltage scaling (DCVS) controller 120 interconnected via SoC bus 115.

The power controller 124 is electrically coupled to a power supply 138 via a power control bus 142, which comprises a power monitor 140 configured to measure energy usage associated with the SoC 102 and the DRAM 104 and, thereby, monitor memory power consumption.

As further illustrated in FIG. 1, the storage controller 122 may be electrically coupled via a storage bus 146 to external storage memory, such as, for example, flash memory 144 or other non-volatile memory device(s). Storage controller 122 controls communication with the external storage memory.

The DCVS controller 120 is configured to implement various DCVS techniques. As known in the art, the DCVS techniques involve selectively adjusting the frequency and/or voltage applied to the SoC components (e.g., CPU 112, power controller 124, DRAM controller 114, and other hardware devices) to yield a desired performance and/or power efficiency characteristics.

The DRAM controller 114 comprises a physical layer 132, which is electrically coupled to a physical layer 106 residing on DRAM 104. Physical layer 106 is coupled to DRAM peripheral logic 108, which is coupled to a cell array 110.

Figure 2:
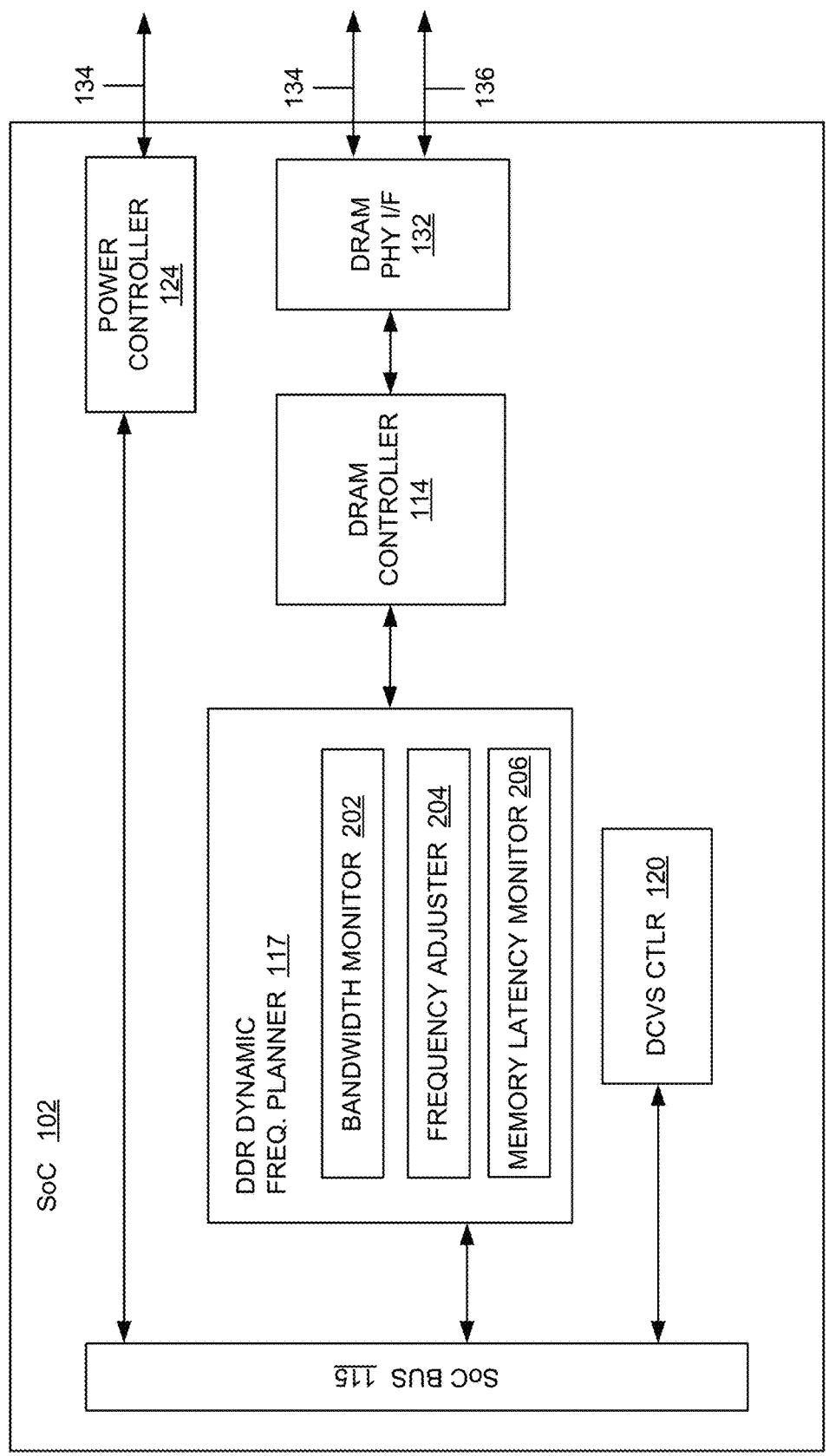
FIG. 2 is a block diagram illustrating an exemplary implementation of the DDR dynamic frequency planning module in FIG. 1.

As further illustrated in FIG. 1, the system 100 comprises specially-configured modules (i.e., DDR dynamic frequency planner 117) for implementing bandwidth-monitoring frequency hopping within a select operating point specified by the DCVS controller 122. FIG. 2 illustrates an exemplary embodiment of the DDR dynamic frequency planner 117, which comprises a bandwidth monitor 202, a frequency adjuster 204, and a memory latency monitor 206. The DDR dynamic frequency planner 117 may be electrically coupled to, or integrated with, DRAM controller 114. The DDR dynamic frequency planner 117 interfaces with the DCVS controller 120 via, for example, SoC bus 115 or other interfaces and/or connections. Various embodiments of the bandwidth monitor 202, the frequency adjuster 204, and the memory latency monitor 206 are described below in more detail.

The DDR dynamic frequency planner 117 may be initialized with various data for coordinating operation of the bandwidth/latency-monitored frequency hopping with dynamic configuration information received from the DCVS controller 120. As mentioned above, the DCVS controller 120 may be configured to select from a plurality of optimal performance/power operating points based on traffic bandwidth requested from memory clients. In general, the frequency and/or voltage of the DDR clock 126 may be adjusted to rise or fall as the traffic bandwidth demand changes. In an embodiment, the DCVS controller 120 may select from a plurality of predefined voltage/frequency bins.

Figure 3:
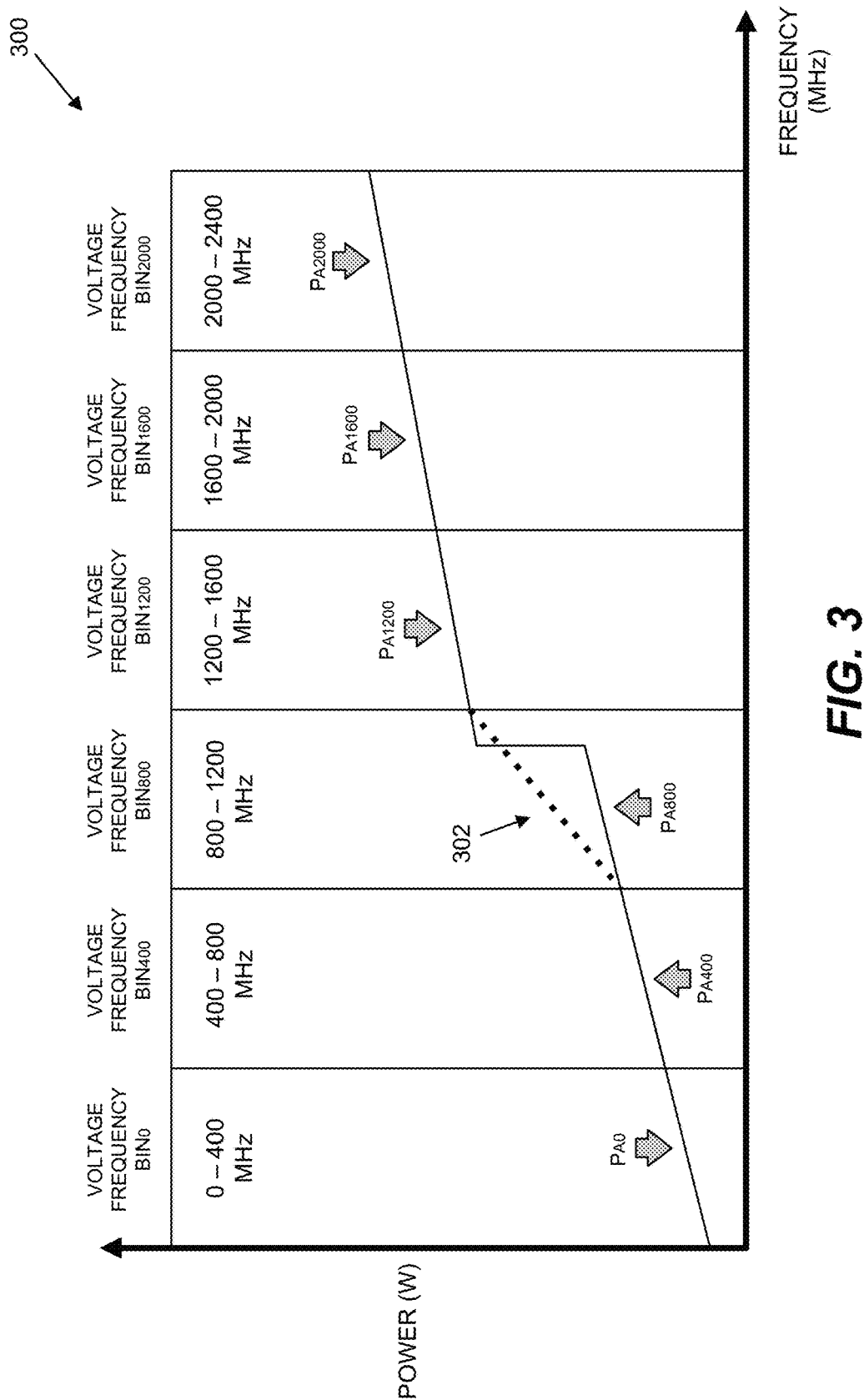
FIG. 3 is an exemplary graph illustrating memory power consumption at various operating points.

FIG. 3 illustrates an exemplary embodiment in which the system 100 provides provides six voltage/frequency bins. A first voltage frequency $bin_0$ comprises the frequency range 0-400 MHz. A second voltage frequency $bin_{400}$ comprises the frequency range 400-800 MHz. A third voltage frequency $bin_{800}$ comprises the frequency range 800-1200 MHz. A fourth voltage frequency $bin_{1200}$ comprises the frequency range 1200-1600 MHz. A fifth voltage frequency $bin_{1600}$ comprises the frequency range 1600-2000 MHz. A sixth voltage frequency $bin_{2000}$ comprises the frequency range 2000-2400 MHz.

Figure 6:
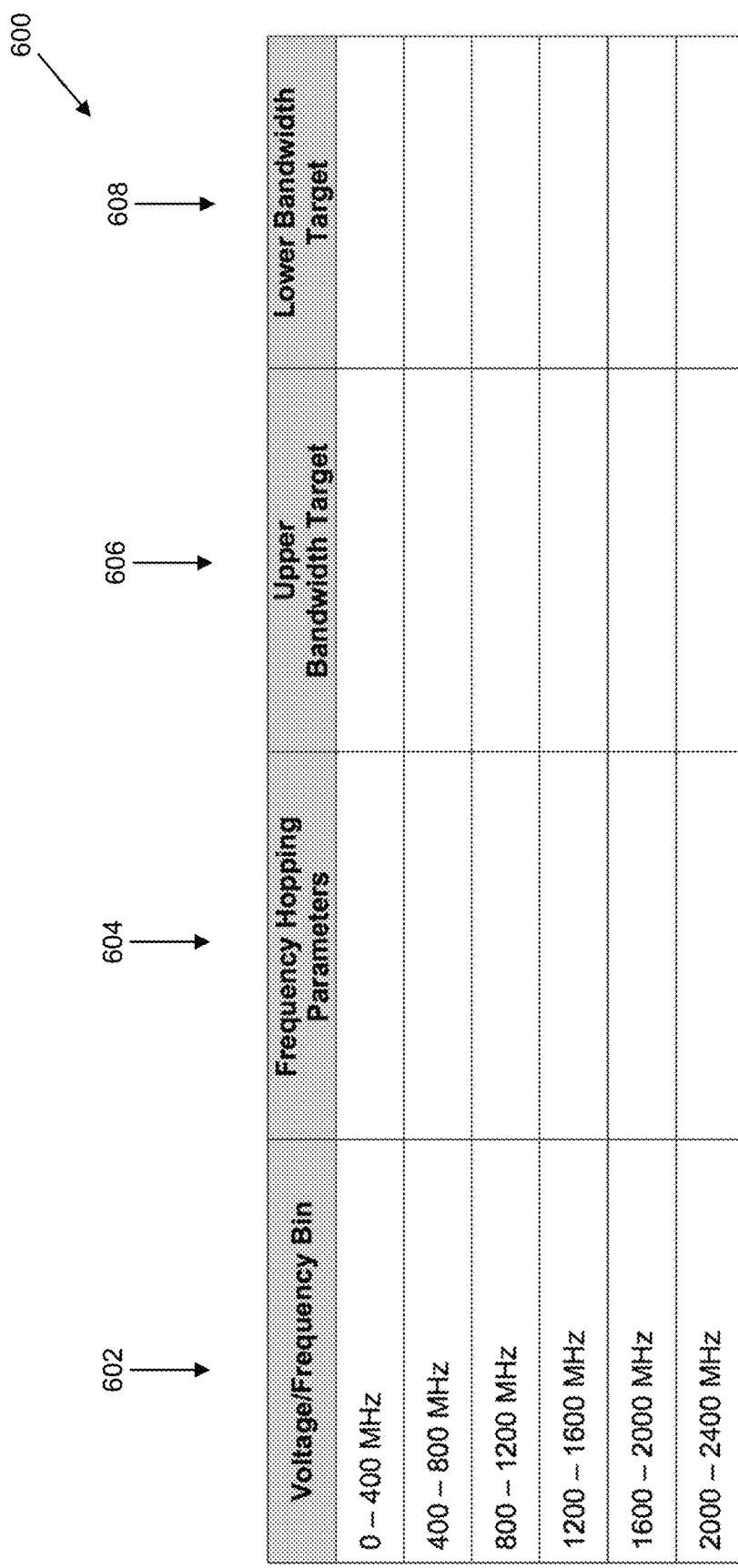
FIG. 6 is a table illustrating exemplary configuration data used by the DDR dynamic frequency planning module.

FIGS. 6 & 7 illustrate data tables 600 and 700, respectively, comprising exemplary configuration information related to the voltage/frequency bins of FIG. 3, which may be used to implement the bandwidth-monitored frequency hopping. As illustrated in FIG. 6, the DDR dynamic frequency planner 117 may be initialized with frequency hopping parameters (column 604) and upper/lower bandwidth targets (columns 606 and 608) for each of the predefined voltage/frequency bins (column 602). This configuration information may be stored in a memory and initialized on boot-up. The upper and lower frequencies comprise the bounds on a voltage level (referred to as a "voltage corner").

In an embodiment, each time a new voltage/frequency bin is entered, the data illustrated in FIG. 7 may be loaded into DDR dynamic frequency planner 117. In other embodiments, the DDR dynamic frequency planner 117 may be pre-loaded at system initialization with this data for each voltage/frequency bin. If the bounds are exceeded, the DCVS controller 120 may raise/lower the voltage level when directing the system 100 to utilize a new voltage/frequency bin. Within a voltage/frequency bin, there may be a predetermined number of frequencies that are "desense acceptable" (i.e., EMI acceptable). "Acceptable" refers to the system 100 being able to reside at a specific frequency for some non-zero residency time. For instance, assume that a voltage/frequency bin has two "acceptable" frequencies, referred to as B1F1 and B1F2 where Bx=bin ID, and Fx is a frequency. A target bandwidth may be defined as the values>=B1F1 and <=B1F2. The mid-point between bandwidth(B1F1) and bandwidth(B1F2) may be defined as the bandwidth target, but bandwidth between these two bounds may be defined as the bandwidth target. As the hopping scheme runs, if the system 100 is consuming bandwidth above the bandwidth target, the DDR dynamic frequency planner 117 adjusts its algorithm to spend more time at B1F2 and less time at B1F1.

Conversely, as the hopping scheme runs, if the system 100 is consuming bandwidth below the bandwidth target, the DDR dynamic frequency planner 117 adjusts its algorithm to spend more time at B1F1 and less time at B1F2. If the system remains consuming less bandwidth than the lower bandwidth target for some predetermined period of time, the DDR dynamic frequency planner 117 may provide a hint signal/data to the DCVS controller 120 indicating that it may lower the voltage/frequency bin to, for example, a value B0 to save power. Similarly, if the system 100 is consuming more than the upper bandwidth target, the DDR dynamic frequency planner 117 may remove the hint signal/data to the DCVS controller 120 indicating that it may lower the voltage/frequency bin.

In further embodiments, the DDR dynamic frequency planner 117 may leverage the memory latency monitor 206. In an embodiment, the memory latency monitor 206 may log a time differential between incoming memory transactions and associated responses. The time differential may be monitored and logged on a per-client basis for one or more memory clients who have registered for this feature (e.g., CPU 112, a digital signal processor (DSP), etc.). The DDR dynamic frequency planner 117 may arithmetically sort the time differentials (e.g., minimum, maximum, mean, median, etc.) and then, similar to the bandwidth monitor 202, compare the latency values or other parameters against a latency threshold (column 708—FIG. 7) for the purpose of driving the frequency up or down, as appropriate.

By way of example, if the latency threshold is exceeded at a given frequency, a higher frequency within the voltage/frequency bin may be selected. If the system 100 is running at the highest frequency in the voltage/frequency bin, with the DCVS hint asserted, and the latency threshold is exceeded, the "hint" which may have been asserted to the DCVS controller 120 to lower the voltage level may then be "de-asserted" so that the DCVS controller 120 may then select the higher voltage level and, therefore, faster bin. When the system is operating below the latency threshold, any of these mechanisms may be undone.

It should be appreciated that the frequency hopping parameters 604 may comprise valid frequencies that may be used for implementing the frequency hopping scheme within a given voltage/frequency bin. As illustrated in FIG. 7, each voltage/frequency bin supported by the DCVS controller 120 may have a corresponding set of valid frequencies (column 702) within that voltage/frequency bin. FIG. 7. For each valid frequency, the configuration information may include additional parameters, such as, for example, a minimum allowable residency time (column 704), a maximum allowable residency time (column 706), and a latency threshold (column 708). FIG. 7 illustrates exemplary frequency hopping parameters for the voltage/frequency bin$_0$, but it should be appreciated that similar data may be stored and made available to the DDR dynamic frequency planner 117 for each supported voltage/frequency bin. As described below in more detail, the minimum allowable residency time in column 704 specifies the minimum amount of time at which the corresponding valid frequency may be operated. The maximum allowable residency time in column 706 specifies the maximum amount of time at which the corresponding valid frequency may be operated. In this regard, it should be appreciated that the minimum and maximum allowable residency times represent a power constraint and an electromagnetic interference (EMI) constraint, respectively.

The EMI of the system 100 refers to a measurement of energy emitted over time. These stored values may be used to control and reduce the amount time the system 100 emits EMI at a given frequency and, thereby, reduce energy consumption. Furthermore, the memory latency threshold in column 708 may specify threshold values that may be used for the purpose of driving up or driving down the selected frequency of the DDR bus. It should be appreciated that, in an exemplary embodiment, the values stored in table 700 (FIG. 7) may be determined during system testing prior to deployment of a commercial system.

In this regard, the DDR dynamic frequency planner 117 enables memory power conservation via the frequency hopping by taking into account how much additional power it may take to switch between frequencies. For example, the DDR dynamic frequency planner 117 may conserve memory power in a given use case by maintaining a corresponding target bandwidth. Rather than running the system at the lowest valid frequency that satisfies the use case, the DDR dynamic frequency planner 117 may optimally switch between two or more predefined frequencies within the current voltage/frequency bin based on a monitored memory bandwidth and/or memory latency. If the additional power required to frequency switch undermines the expected power savings, the DDR dynamical frequency planner 117 may determine that frequency switching is not to be performed.

Figure 4:
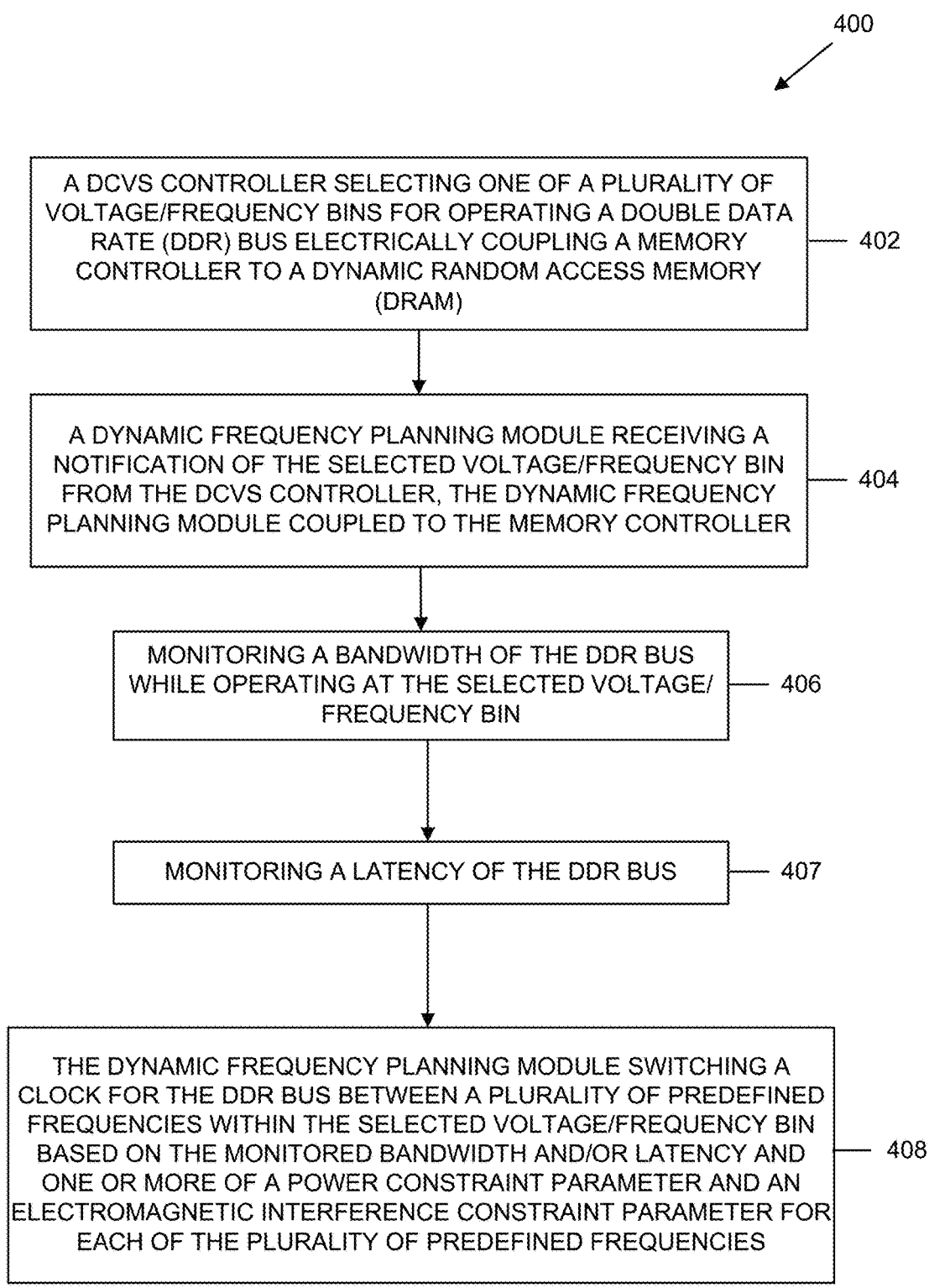
FIG. 4 is a flowchart illustrating an embodiment of a method for implementing bandwidth/latency-monitored frequency hopping within a selected DRAM operating point.

FIG. 4 illustrates an exemplary method 400 for implementing bandwidth/latency-monitored frequency hopping in the system 100. At block 402, the DCVS controller 120 may select one of a plurality of power/performance operating points (e.g., voltage/frequency bins) for operating the DDR bus. The DCVS controller 120 may receive bandwidth votes from one or more memory clients, determine a memory bandwidth demand, and determine an appropriate operating point that meets the bandwidth demand. The DCVS controller 120 may provide various types of information to the DDR dynamic frequency planner 117 related to the current selected operating point. For example, the DCVS controller 117 may provide a current selected voltage/frequency bin, an active voltage, or other similar data. At block 404, the DDR dynamic frequency planner 117 receives the information identifying the current selected operating point. At block 406, the bandwidth monitor 202 monitors the memory traffic on the DDR bus (e.g., DRAM control and data bus 134) while the system 100 is operating at the current selected voltage/frequency bin. As mentioned above, at block 407, the latency monitor 206, may monitor incoming memory transactions from one or more memory clients and determine whether a current latency threshold (column 708—FIG. 7) has been exceeded.

At block 408, the frequency adjuster 204 switches the frequency of the DRAM clock 136 between a plurality of predefined valid frequencies within the current selected voltage/frequency bin based on the monitored bandwidth and/or the monitored memory latency values. As mentioned above, the valid frequencies for the current selected voltage/frequency bin may be stored in a table 700 with corresponding frequency hopping parameters (e.g., minimum allowable residency time (column 704), maximum allowable residency time (column 706), and latency threshold (column 708).

It should be appreciated that the frequency switching/hopping algorithm coupled to the bandwidth monitor 202 and/or the latency monitor 206 may enable the DRAM clock 136 to be run, on average, at an optimal rate for the actual bandwidth requirements that minimizes power consumption while also spreading EMI energy from the DRAM control and data bus 134 in a bandwidth deterministic (but not data pattern deterministic) manner. As illustrated in FIG. 3, the bandwidth-monitored frequency hopping may reduce the average power consumption (dashed line 302) while operating within a selected voltage/frequency bin. It should be further appreciated that the bandwidth-monitored frequency hopping method may be further implemented across multiple voltage/frequency bins using the hint signaling/data between the DDR dynamic frequency planner 117 and the DCVS controller 120.

Figure 5:
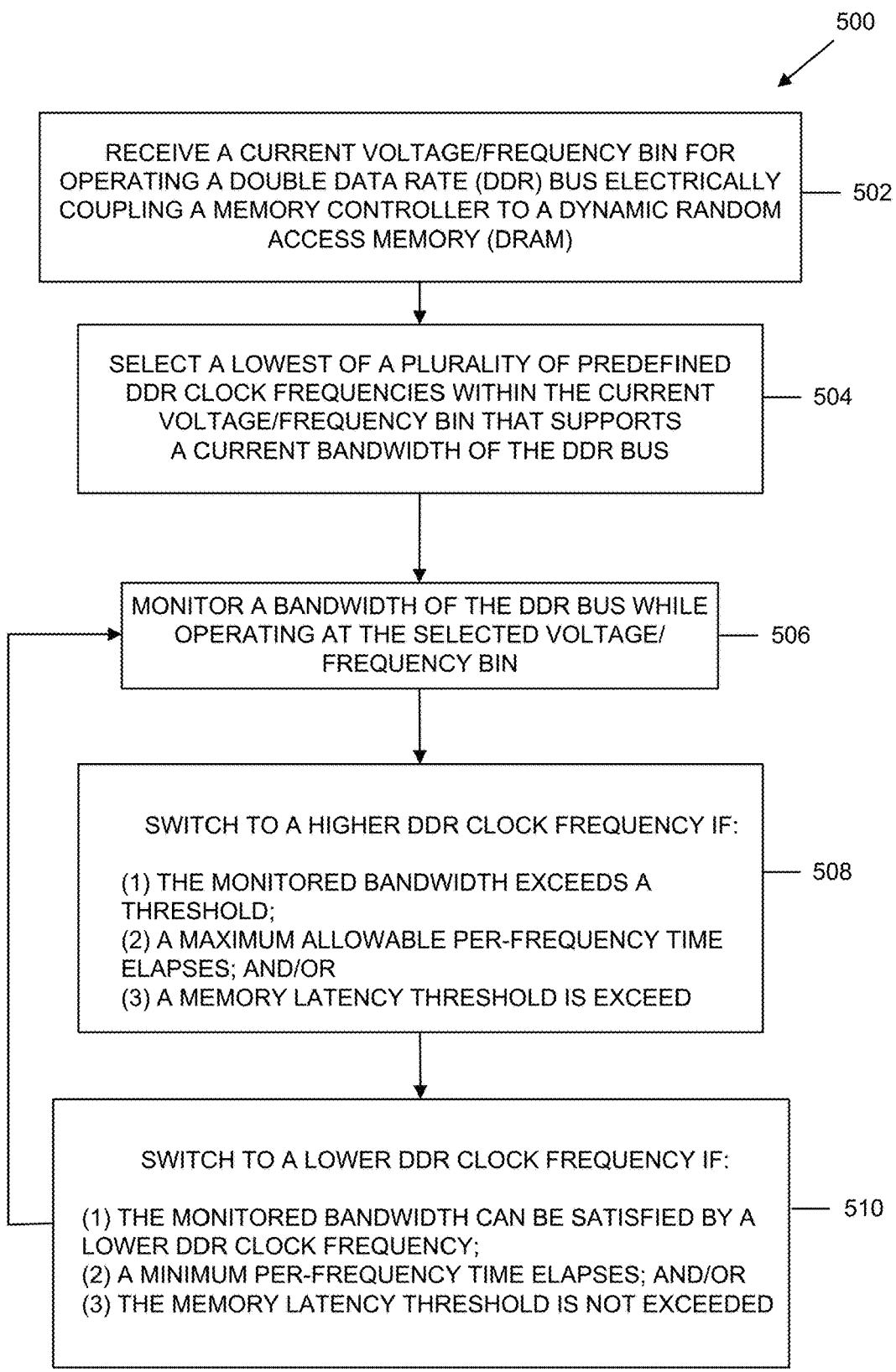
FIG. 5 is a flowchart illustrating another embodiment of a method for implementing bandwidth/latency-monitored frequency hopping within a selected DRAM operating point.

FIG. 5 illustrates another embodiment of a method 500 for implementing the bandwidth/latency-monitored frequency hopping scheme within a current operating point determined by the DCVS controller 120. At block 502, the DDR dynamic frequency planner 117 may receive information related to a current voltage/frequency bin for operating the DDR bus. As illustrated at block 504, the algorithm may establish a control priority of maintaining the lowest DRAM clock frequency that will support a currently observed bandwidth. Based on a current bandwidth on the DRAM control and data bus 134, the DDR dynamic frequency planner 117 may select the lowest of the predefined valid frequencies (column 702) that supports the current bandwidth. As illustrated at block 506, the bandwidth monitor 202 monitors the memory traffic on the DRAM control and data bus 134 while the system 100 is operating at the current selected voltage/frequency bin (block 502). In general, the frequency hopping scheme may adjust the DRAM clock frequency based on the monitored bandwidth and the maximum and minimum allowable residency times specified in the table 700 for the current clock frequency. At block 508, the frequency adjuster 204 may switch to a higher clock frequency, for example, if the monitored bandwidth from bandwidth monitor 202 exceeds the target bandwidth and/or a threshold increased rate of change or a maximum allowable residency time elapses (as described above) and/or if a memory latency determined by the memory latency monitor 206 is exceeded. At block 510, the frequency adjuster 204 may switch to a lower clock frequency if the monitored bandwidth can be satisfied by a lower clock frequency and/or the minimum allowable residency time specified for the current clock frequency has elapsed and/or if the memory latency does not exceed a memory latency threshold. As shown by the feedback loop in FIG. 5, blocks 506, 508, and 508 may be repeated throughout the frequency hopping scheme. Furthermore, it should be appreciated that the DDR dynamic frequency planner 117 may also communicate "hints" back to the DCVS controller 120 indicating that the current operating point may be lowered or raised based on the bandwidth monitor 202.

Figure 8:
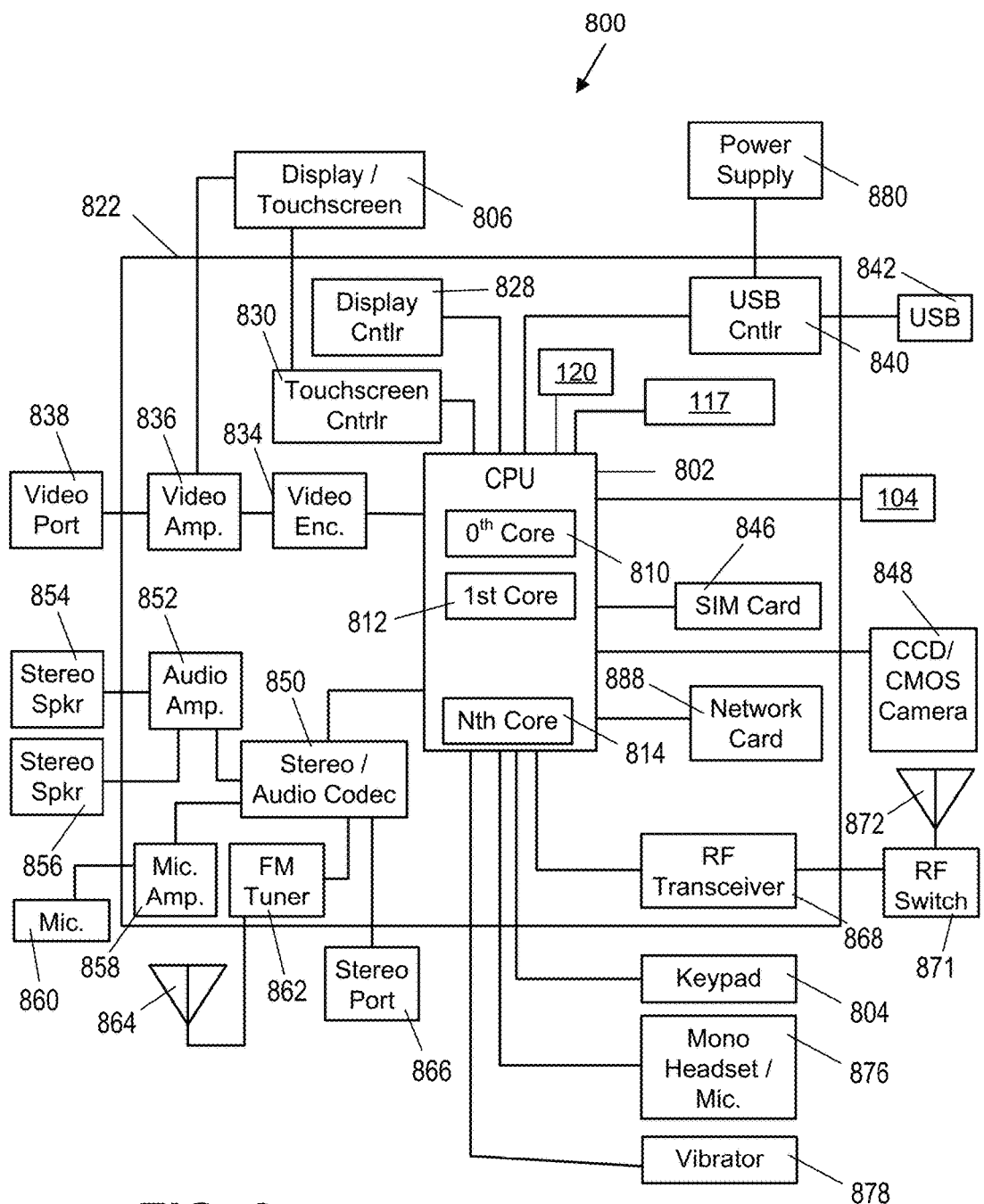
FIG. 8 is a block diagram of an exemplary embodiment of a portable computing device for incorporating the system of FIG. 1.

As mentioned above, the system 100 may be incorporated into any desirable computing system. FIG. 8 illustrates the system 100 incorporated in an exemplary portable computing device (PCD) 800. It will be readily appreciated that certain components of the system 100 may be included on the SoC 822 while other components (e.g., DRAM 104) may be external components coupled to the SoC 822. The SoC 822 may include a multicore CPU 802. The multicore CPU 802 may include a zeroth core 810, a first core 812, and an Nth core 814. One of the cores may comprise, for example, a graphics processing unit (GPU) with one or more of the others comprising the CPU 802.

A display controller 828 and a touch screen controller 830 may be coupled to the CPU 802. In turn, the touch screen display 806 external to the on-chip system 822 may be coupled to the display controller 828 and the touch screen controller 830.

FIG. 8 further shows that a video encoder 834, e.g., a phase alternating line (PAL) encoder, a sequential color a memoire (SECAM) encoder, or a national television system (s) committee (NTSC) encoder, is coupled to the multicore CPU 802. Further, a video amplifier 836 is coupled to the video encoder 834 and the touch screen display 806. Also, a video port 838 is coupled to the video amplifier 836. As shown in FIG. 8, a universal serial bus (USB) controller 840 is coupled to the multicore CPU 802. Also, a USB port 842 is coupled to the USB controller 840.

Further, as shown in FIG. 8, a digital camera 848 may be coupled to the multicore CPU 802. In an exemplary aspect, the digital camera 848 is a charge-coupled device (CCD) camera or a complementary metal-oxide semiconductor (CMOS) camera.

As further illustrated in FIG. 8, a stereo audio coder-decoder (CODEC) 850 may be coupled to the multicore CPU 802. Moreover, an audio amplifier 852 may coupled to the stereo audio CODEC 850. In an exemplary aspect, a first stereo speaker 854 and a second stereo speaker 856 are coupled to the audio amplifier 852. FIG. 8 shows that a microphone amplifier 858 may be also coupled to the stereo audio CODEC 850. Additionally, a microphone 860 may be coupled to the microphone amplifier 858. In a particular aspect, a frequency modulation (FM) radio tuner 862 may be coupled to the stereo audio CODEC 850. Also, an FM antenna 864 is coupled to the FM radio tuner 862. Further, stereo headphones 866 may be coupled to the stereo audio CODEC 850.

FIG. 8 further illustrates that a radio frequency (RF) transceiver 868 may be coupled to the multicore CPU 802. An RF switch 870 may be coupled to the RF transceiver 868 and an RF antenna 872. A keypad 804 may be coupled to the multicore CPU 802. Also, a mono headset with a microphone 876 may be coupled to the multicore CPU 802. Further, a vibrator device 878 may be coupled to the multicore CPU 802.

FIG. 8 also shows that a power supply 880 may be coupled to the on-chip system 822. In a particular aspect, the power supply 880 is a direct current (DC) power supply that provides power to the various components of the PCD 800 that require power. Further, in a particular aspect, the power supply is a rechargeable DC battery or a DC power supply that is derived from an alternating current (AC) to DC transformer that is connected to an AC power source.

FIG. 8 further indicates that the PCD 800 may also include a network card 888 that may be used to access a data network, e.g., a local area network, a personal area network, or any other network. The network card 888 may be a Bluetooth network card, a WiFi network card, a personal area network (PAN) card, a personal area network ultra-low-power technology (PeANUT) network card, a television/cable/satellite tuner, or any other network card well known in the art. Further, the network card 888 may be incorporated into a chip, i.e., the network card 888 may be a full solution in a chip, and may not be a separate network card 888.

As depicted in FIG. 8, the touch screen display 806, the video port 838, the USB port 842, the camera 848, the first stereo speaker 854, the second stereo speaker 856, the microphone 860, the FM antenna 864, the stereo headphones 866, the RF switch 870, the RF antenna 872, the keypad 874, the mono headset 876, the vibrator 878, and the power supply 880 may be external to the on-chip system 822.

It should be appreciated that one or more of the method steps described herein may be stored in the memory as computer program instructions, such as the modules described above. These instructions may be executed by any suitable processor in combination or in concert with the corresponding module to perform the methods described herein.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, NAND flash, NOR flash, M-RAM, P-RAM, R-RAM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Alternative embodiments will become apparent to one of ordinary skill in the art to which the invention pertains without departing from its spirit and scope. Therefore, although selected aspects have been illustrated and described in detail, it will be understood that various substitutions and alterations may be made therein without departing from the spirit and scope of the present invention, as defined by the following claims.

What is claimed is:

1. A method for reducing dynamic random access memory (DRAM) power consumption within a selected voltage frequency/bin, the method comprising:
   receiving a selected voltage/frequency bin of a plurality of predefined voltage/frequency bins for operating a memory bus electrically coupling a memory controller to a dynamic random access memory, each voltage/frequency bin including a plurality of predefined frequencies;
   monitoring a bandwidth of the memory bus while operating at the selected voltage/frequency bin; and
   based on the monitored bandwidth, frequency switching a clock for the memory bus between a plurality of the predefined frequencies within the selected voltage/frequency bin to maintain a target bandwidth by maintaining an average clock frequency.

2. The method of claim 1, wherein the selected voltage/frequency bin is received from a dynamic clock and voltage scaling (DCVS) controller.

3. The method of claim 1, further comprising:
   monitoring a memory latency;
   wherein the frequency switching comprises selecting a higher frequency within the selected voltage/frequency bin if the memory latency exceeds a threshold.

4. The method of claim 1, wherein the frequency switching of the clock for the memory bus between the plurality of predefined frequencies is further based on one or more of a power constraint parameter and an electromagnetic interference (EMI) constraint parameter for each of the predefined frequencies.

5. The method of claim 4, wherein the power constraint parameter comprises a minimum allowable residency time and the EMI constraint parameter comprises a maximum allowable residency time.

6. The method of claim 1, wherein the frequency switching the clock for the memory bus between the plurality of predefined frequencies within the selected voltage/frequency bin comprises:
   if the monitored bandwidth exceeds a threshold increased rate of change or a maximum allowable residency time elapses, switching to a higher clock frequency.

7. The method of claim 1, wherein the frequency switching the clock for the memory bus between the plurality of predefined frequencies within the selected voltage/frequency bin comprises:
   if a minimum allowable residency time has elapsed and the monitored bandwidth can be satisfied by a lower frequency, switching to a lower clock frequency.

8. The method of claim 1, further comprising:
   in response to the monitored bandwidth and a monitored memory latency, notifying a dynamic clock and voltage scaling (DCVS) controller that the selected voltage/frequency bin may be adjusted.

9. A system for reducing dynamic random access memory (DRAM) power consumption within a selected voltage frequency/bin, the method comprising:
   means for receiving a selected voltage/frequency bin of a plurality of predefined voltage/frequency bins for operating a memory bus electrically coupling a memory controller to a dynamic random access memory (DRAM), each voltage/frequency bin including a plurality of predefined frequencies;
   means for monitoring a bandwidth of the memory bus while operating at the selected voltage/frequency bin; and
   means for frequency switching a clock for the memory bus between a plurality of the predefined frequencies within the selected voltage/frequency bin based on the monitored bandwidth to maintain a target bandwidth by maintaining an average clock frequency.

10. The system of claim 9, further comprising:
    means for monitoring a memory latency;
    wherein the means for frequency switching comprises a means for selecting a higher frequency within the selected voltage/frequency bin if the memory latency exceeds a threshold.

11. The system of claim 9, wherein the means for frequency switching the clock for the memory bus between the plurality of predefined frequencies is further based on one or more of a power constraint parameter and an electromagnetic interference (EMI) constraint parameter for each of the predefined frequencies.

12. The system of claim 11, wherein the power constraint parameter comprises a minimum allowable residency time and the EMI constraint parameter comprises a maximum allowable residency time.

13. The system of claim 9, wherein the means for frequency switching the clock for the memory bus between the plurality of predefined frequencies within the selected voltage/frequency bin comprises:
    means for switching to a higher clock frequency if the monitored bandwidth exceeds a threshold increased rate of change or a maximum allowable residency time elapses.

14. The system of claim 9, wherein the means for frequency switching the clock for the memory bus between the plurality of predefined frequencies within the selected voltage/frequency bin comprises:
    means for switching to a lower clock frequency if a minimum allowable residency time has elapsed and the monitored bandwidth can be satisfied by a lower frequency.

15. The system of claim 9, further comprising:
    means for notifying a dynamic clock and voltage scaling (DCVS) controller that the selected voltage/frequency bin may be adjusted based on the monitored bandwidth and a monitored memory latency.

16. A computer program embodied in a non-transitory computer readable medium and executed by a processor for reducing dynamic random access memory (DRAM) power consumption within a selected voltage frequency/bin, the computer program comprising logic configured to:
    receive a selected voltage/frequency bin of a plurality of predefined voltage/frequency bins for operating a memory bus electrically coupling a memory controller to a dynamic random access memory (DRAM), each voltage/frequency bin including a plurality of predefined frequencies;
    monitor a bandwidth of the memory bus while operating at the selected voltage/frequency bin; and
    frequency switch a clock for the memory bus between a plurality of the predefined frequencies within the selected voltage/frequency bin based on the monitored bandwidth to maintain a target bandwidth by maintaining an average clock frequency.

17. The computer program of claim 16, wherein the selected voltage/frequency bin is received from a dynamic clock and voltage scaling (DCVS) controller.

18. The computer program of claim 16, further comprising:
    logic configured to monitor a memory latency;
    wherein the logic configured to frequency switch comprises selecting a higher frequency within the selected voltage/frequency bin if the memory latency exceeds a threshold.

19. The computer program of claim 16, wherein the frequency switching of the clock for the memory bus between the plurality of predefined frequencies is further based on one or more of a power constraint parameter and an electromagnetic interference (EMI) constraint parameter for each of the predefined frequencies.

20. The computer program of claim 19, wherein the power constraint parameter comprises a minimum allowable residency time and the EMI constraint parameter comprises a maximum allowable residency time.

21. The computer program of claim 16, wherein the frequency switching the clock for the memory bus between the plurality of predefined frequencies within the selected voltage/frequency bin comprises:
    if the monitored bandwidth exceeds a threshold increased rate of change or a maximum allowable residency time elapses, switching to a higher clock frequency.

22. The computer program of claim 16, wherein the frequency switching the clock for the memory bus between the plurality of predefined frequencies within the selected voltage/frequency bin comprises:
    if a minimum allowable residency time has elapsed and the monitored bandwidth can be satisfied by a lower frequency, switching to a lower clock frequency.

23. The computer program of claim 16, further comprising logic configured to notify a dynamic clock and voltage scaling (DCVS) controller that the selected voltage/frequency bin may be adjusted.

24. A system for reducing dynamic random access memory (DRAM) power consumption within a selected voltage frequency/bin, the system comprising:
- a dynamic clock and voltage scaling (DCVS) controller configured to select one of a plurality of voltage/frequency bins of a plurality of predefined voltage/frequency bins for operating a memory bus, each voltage/frequency bin including a plurality of predefined frequencies;
- a memory controller electrically coupled to a dynamic random access memory (DRAM) via the memory bus; and
- a dynamic frequency planning module in communication with the memory controller and the DCVS controller, the dynamic frequency planning module comprising logic configured to:
  - receive the selected voltage/frequency bin from the DCVS controller;
  - monitor a bandwidth of the memory bus while operating at the selected voltage/frequency bin; and
  - frequency switch a clock for the memory bus between a plurality of the predefined frequencies within the selected voltage/frequency bin based on the monitored bandwidth to maintain a target bandwidth by maintaining an average clock frequency.

25. The system of claim 24, wherein the DCVS controller, the memory controller, and the dynamic frequency planning module reside on a system on chip (SoC) electrically coupled to the DRAM.

26. The system of claim 24, wherein the logic configured to frequency switch the clock for the memory bus between the plurality of predefined frequencies is further based on one or more of a power constraint parameter and an electromagnetic interference (EMI) constraint parameter for each of the predefined frequencies.

27. The system of claim 26, wherein the power constraint parameter comprises a minimum allowable residency time and the EMI constraint parameter comprises a maximum allowable residency time.

28. The system of claim 24, wherein the frequency switching the clock for the memory bus between the plurality of predefined frequencies within the selected voltage/frequency bin comprises:
- if the monitored bandwidth exceeds a threshold increased rate of change or a maximum allowable residency time elapses, switching to a higher clock frequency.

29. The system of claim 24, wherein the frequency switching the clock for the memory bus between the plurality of predefined frequencies within the selected voltage/frequency bin comprises:
- if a minimum allowable residency time has elapsed and the monitored bandwidth can be satisfied by a lower frequency, switching to a lower clock frequency.

30. The system of claim 24, wherein the dynamic frequency planning module comprises logic configured to monitor a memory latency;
- wherein the frequency switching comprises selecting a higher frequency within the selected voltage/frequency bin if the memory latency exceeds a threshold.

* * * * *